April 4, 1961 W. S. BLANDING ET AL 2,978,564
ELECTRIC HOT PLATE
Filed Dec. 31, 1958 2 Sheets-Sheet 1

INVENTORS
WENDELL S. BLANDING
AND JAMES P. HOCKER
BY
Clarence R. Patty, Jr.
ATTORNEY April 4, 1961 W. S. BLANDING ET AL 2,978,564
ELECTRIC HOT PLATE
Filed Dec. 31, 1958 2 Sheets-Sheet 2

INVENTORS
WENDELL S. BLANDING
AND JAMES P. HOCKER
BY
Clarence R. Patty, Jr.
ATTORNEY I# United States Patent Office 2,978,564
Patented Apr. 4, 1961

2,978,564

ELECTRIC HOT PLATE

Wendell S. Blanding, Painted Post, and James P. Hocker, Corning, N.Y., assignors to Corning Glass Works, Corning, N.Y., a corporation of New York Filed Dec. 31, 1958, Ser. No. 784,174

4 Claims. (Cl. 219—19)

The present invention relates to electric appliances and particularly to a portable electric hot plate equipped with a manually adjustable thermostat. Preferably, such hot plate is designed with a view to its use in heating a sauce pan or the like having a size and shape best adapting it for use therewith.

According to the invention a shell of low expansion dielectric material, in the form of an inverted shallow walled pan, utilizes the exterior surface of its bottom as a temperature controlled cooking vessel receiving surface by having an electric heating element and a temperature sensing element pressed against its interior surface. The heating element comprises a flat sinuated coil and the temperature sensing element comprises a bar of high expansion material that, in addition to being pressed against the interior surface of the shell bottom, is anchored at one end to the shell wall and at the other end in operative relation with contacts included in series with the heating element circuit and supported on the shell wall at the opposite margin of the shell bottom. Additionally, the shell is provided on two oppositely disposed wall regions with handles in one of which is embodied an indicator light and the thermostat regulating knob. Also embodied in association with both such handles are resiliently hinged vessel aligning assemblies movable into and out of cooperative relation with a vessel arranged on the hot plate.

For a better understanding of the invention reference is made to the accompanying drawing in which.

Figure 1:
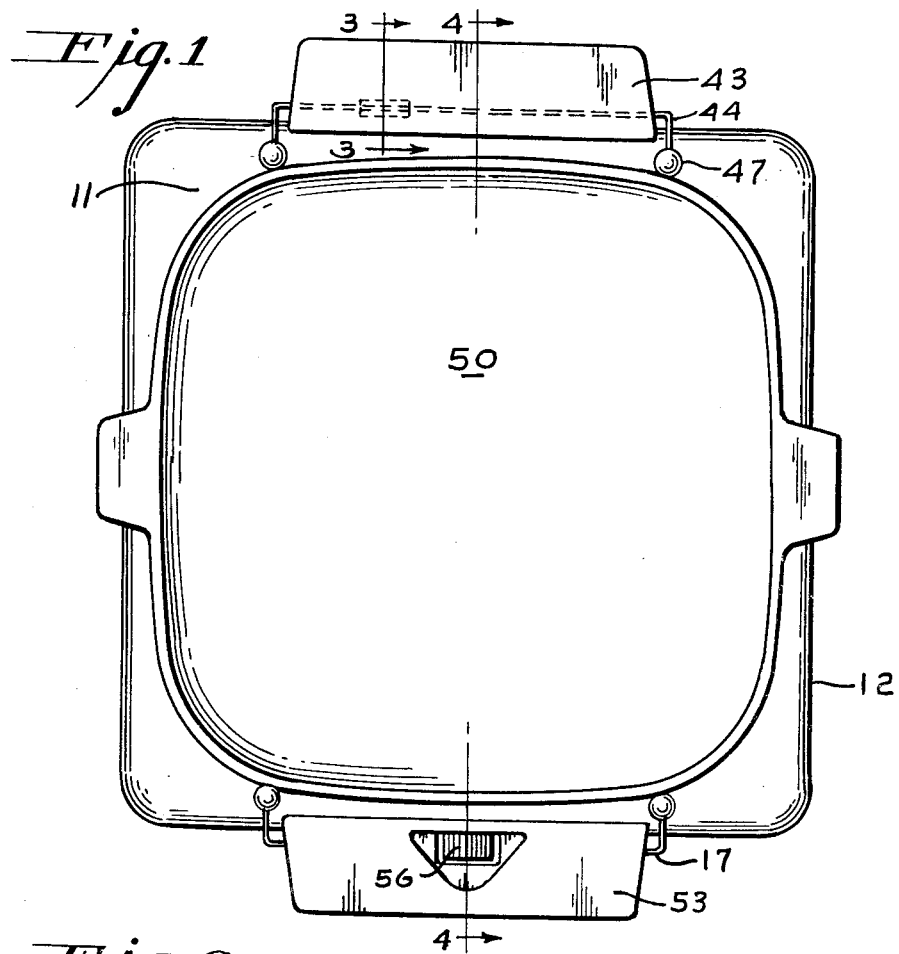
Fig. 1 is a top plan view of a hot plate embodying the invention having supported thereon a sauce pan especially suitable for use thereon.
Figure 2:
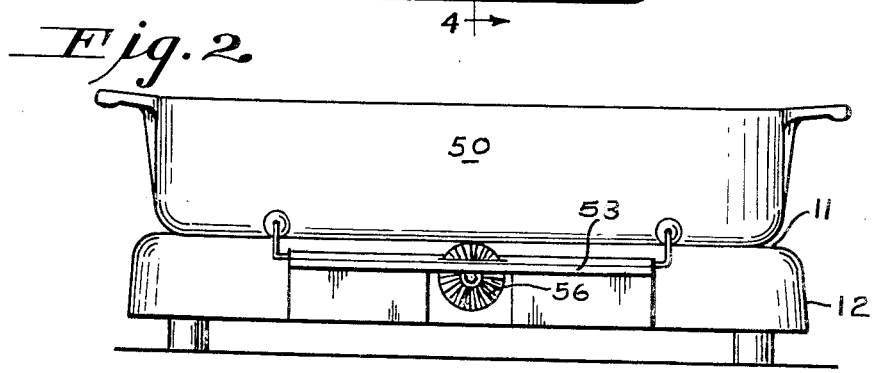
Fig. 2 is a side elevation of the hot plate and vessel respectively.

Referring to the drawings in detail the reference numeral 11 designates the bottom wall of the shell of dielectric material and which has a surrounding side wall 12.

Figure 7:
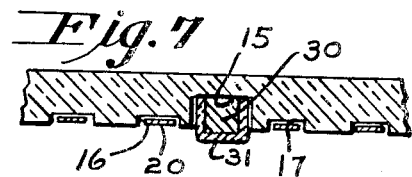
Figure 6:
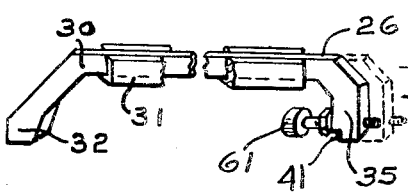
Fig. 6 is a perspective view of the thermostat sensing element or bar.
Figure 8:
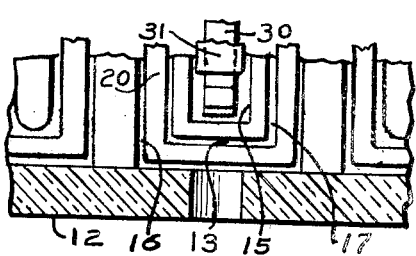

Figs. 7 and 8, respectively, are enlarged sectional views of a fragment of the hot plate and of elements embodied in grooves therein.

The inner surface of wall 11 has a relatively deep groove 15 dividing such surface into two equal areas provided with sinuous relatively shallow grooves 16 and 17 respectively, which join one another at 13 beyond one end of groove 15 terminating short of the adjacent region of wall 12 of the shell.

A ribbon heating element 20 occupies grooves 16 and 17 and has its ends terminated in their outer end regions and connected by means of leads 18 and 19, respectively, to a screw terminal assembly 21 and to a terminal for a contact spring 25 of an assembly fully described hereinafter. The heating element 20 is held in intimate contact with the bottoms of grooves 16 and 17 by a resilient pad 22 of thermal insulating material clamped between wall 11 and a cover 23 held in place by screws such as 28 threaded into brackets such as 34. Cover 23 is provided with supporting feet 29.

Arranged in groove 15 is a sensing element or bar 30 of high expansion material having a flat surface 26 faced against the bottom of groove 15 and provided on its remaining surrounding surfaces with a jacket 31 of thermal insulation to protect it from being unduly affected by ambient temperatures.

The end 32 of bar 30 is wedge shaped and projects into a socket 33 in part formed by bracket 34 and at that end tending to force bar end 32 against the shell wall and the flat surface 26 of the bar in intimate contact with the bottom of groove 15. The bar end 35 occupies a slot 36 in a rigidly held plate 37. A wire spring 38 has one end anchored to a control spring clamping assembly screw 65 passing through plate 37 and occupying a notch 41 in the end 35 of bar 30. Spring 38 is tensioned to apply a force to the end 35 of bar 30 in a direction to aid socket 33 in holding the surface 26 of bar 30 throughout its length in intimate and good heat transfer relationship with the shell bottom via the bottom of groove 15.

Figure 3:
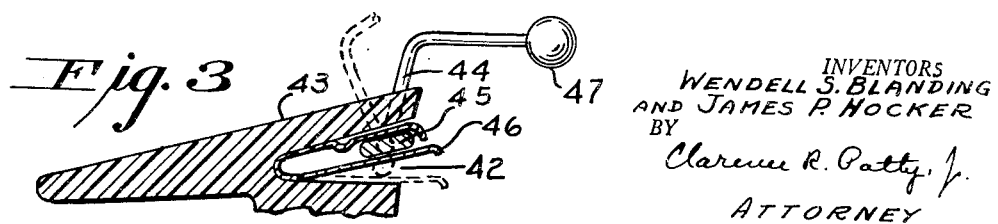
Fig. 3 is an enlarged fragmentary view taken on line 3—3 of Fig. 1.
Figure 4:
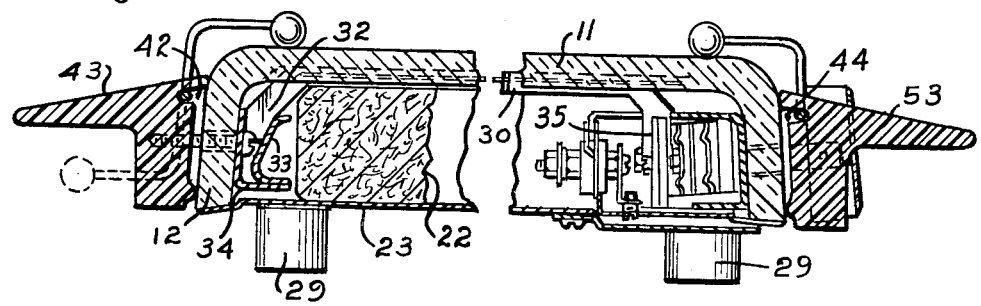
Fig. 4 is a sectional view taken on line 4—4 of Fig. 1.
Figure 5:
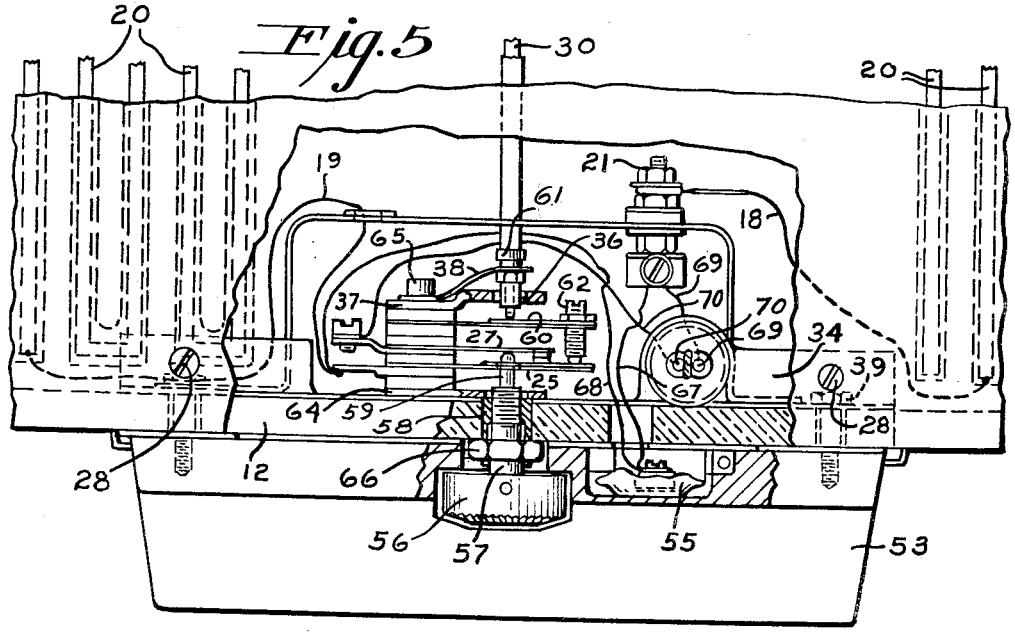
Fig. 5 is an enlarged bottom plan view of a fragment of the hot plate with certain parts broken away to show the interior thereof.

The bracket 34, which forms part of socket 33, is attached to the shell wall 12 by means of screws such as 39 passing through such wall and threaded into a handle 53 arranged on its exterior surface. Formed in handle 53, and in the similar handle 43 on the opposite wall of the shell, is a pocket such as 42 (Fig. 3) extending the handle length and occupied by a rod 44. Rod 44 has a flattened region 45 passing through a generally U-shaped leaf spring 46 tending to hold the rod turned to a position in which bent ends thereof terminated in knobs such as 47 overlay the outer surface of wall 11, or alternatively maintain them in a position away from such surface as illustrated in Fig. 4. As is clear from Fig. 1 the knobs such as 47 cooperate with the wall of a vessel such as 50 to maintain it properly centered on the hot plate. Movement of such knobs to their alternative positions serves to facilitate cleaning of the hot plate surface.

Handle 53, in addition to housing a rod, such as 44, has cavities for receipt of a pilot light 55 and a thermostat control knob 56, respectively.

The knob 56 is mounted on a shaft 57 threaded through a bushing 58. A pin 59 of dielectric material projects from the free end of shaft 57 through an aperture in contact spring 25 into engageable relation with a spring 27 whose contact is mated with that of spring 25 and positioned in accordance with the setting of knob 47. The position of spring 25 with respect to spring 27 for any setting of knob 47 is under control of bar 30 through the medium of a bar operated spring 60 which is variably engageable by a screw 61 carried by bar 30 and which spring carries at its free end a set screw 62 engageable with the free end of spring 25. Springs 25, 27, and 60 and the plate 37 are conventionally insulated from one another and held clamped to a bracket 64 by the screw 65. Bracket 64 is fixed to the bushing 58 which is clamped to wall 12 by a nut 66. As will be understood, the tempearture at which rod 30, through the medium of spring 60 and screw 62, moves spring 25 clear of spring 27 depends upon the position of the latter spring as determined by the setting of knob 47.

One current supply lead 69 is directly connected to the terminal assembly 21 and, via a lead 67, is also connected to one terminal of lamp 55. The other current supply lead 70 connects directly with contact spring 27. A lead 68 connects the spring 25 with the other terminal of lamp 55. It follows that whenever the contacts of springs 25 and 27 are in contact the lamp 55 and the heating element 20 are energized.

What is claimed is:

1. In an electric heating unit, a plate of low expansion ceramic material embodied in a shallow walled shell whose exterior bottom surface is adapted for the support of appliances to be heated, said plate having a relatively deep groove in the inner side of its bottom of substantial depth whose one end terminates short of the adjacent lateral inner border of the plate wall, thus substantially equally dividing the under surface of such plate into two portions, said plate having relatively shallow sinuous grooves in the respective portions joining one another beyond such one end of the relatively deep groove, a heating element occupying said sinuous grooves having its free ends terminating at the ends thereof remote from their ends of juncture, a temperature sensing rod of high expansion material arranged in said relatively deep groove, means anchoring one end of said rod to the adjoining wall of said plate, and a pair of heating element circuit control springs supported on the plate wall adjacent the other end of the bar and arranged in operative relation therewith.

2. In an electric hot plate, an element having a flat top surface for receipt of cooking ware to be heated thereon, lifting handles arranged at two opposite margins of said plate, means for centering such cooking ware on the plate comprising elements pivoted through said handles and having end portions movable through pivotal action of such elements to positions over such top surface and away from such top surface respectively and means housed within the handles cooperative with such elements to resiliently retain them in the positions to which they have been turned.

3. An electric hot plate as in claim 2 wherein the flat top is impervious and extends over a substantial area and wherein each of such elements has two end portions substantially spaced from one another.

4. In a heater, a rigid plate of glass-like material and a rigid plate of metal, said plates forming a flat chamber therebetween; an elongated, electrically conductive heating element disposed in said chamber, in broad contact with said plate of glass-like material; and a resilient, heat insulating mat or pad in said chamber, reacting between said rigid plates to maintain distributed pressure between contacting surfaces of said plate of glass-like material and said heating element; the improvement which comprises the embodiment in said chamber of a four-sided temperature sensing bar having a high coefficient of expansion, compared to said plate of glass-like material, occupying a groove extending across said plate; means at the respective ends of the bar for resiliently maintaining one side thereof throughout its length in intimate contact with the groove bottom, said means at one end of the bar also anchoring it to said plate, a cover of thermal insulation arranged about the three remaining sides of said bar to protect it from exposure to ambient temperatures, and a heating element circuit control contact spring arranged in operative relationship with the other end of said bar.

References Cited in the file of this patent

UNITED STATES PATENTS

| | | |
|---|---|---|
| 1,422,735 | Brown et al. | July 11, 1922 |
| 1,882,901 | Reichart | Oct. 18, 1932 |
| 2,024,856 | Graham | Dec. 17, 1935 |
| 2,253,927 | Butler et al. | Aug. 26, 1941 |
| 2,603,740 | Del Buttero | July 15, 1952 |
| 2,749,426 | Schwaneke | June 5, 1956 |
| 2,798,931 | Naxon | July 9, 1957 |
| 2,799,765 | Jenkins et al. | July 16, 1957 |
| 2,830,166 | Loomis | Apr. 8, 1958 |
| 2,867,710 | Glynn | Jan. 6, 1959 |
| 2,872,561 | Humphrey | Feb. 3, 1959 |